US012523382B2

(12) United States Patent
Ardkapan et al.

(10) Patent No.: US 12,523,382 B2
(45) Date of Patent: Jan. 13, 2026

(54) AIR CLEANING DEVICE

(71) Applicant: Respired Limited, London (GB)

(72) Inventors: Siamak Ardkapan, Copenhagen (DK); Matthew Johnson, Copenhagen (DK)

(73) Assignee: Respired Limited, London (GB)

( * ) Notice: Subject to any disclaimer, the term of this patent is extended or adjusted under 35 U.S.C. 154(b) by 362 days.

(21) Appl. No.: 18/255,230

(22) PCT Filed: Nov. 29, 2021

(86) PCT No.: PCT/EP2021/083319
§ 371 (c)(1),
(2) Date: May 31, 2023

(87) PCT Pub. No.: WO2022/117492
PCT Pub. Date: Jun. 9, 2022

(65) Prior Publication Data

US 2024/0035689 A1 Feb. 1, 2024

(30) Foreign Application Priority Data

Dec. 1, 2020 (EP) .................................... 20210985

(51) Int. Cl.
*F24F 8/108* (2021.01)
*B60H 3/06* (2006.01)

(52) U.S. Cl.
CPC ........... *F24F 8/108* (2021.01); *B60H 3/0608* (2013.01); *F24F 2221/14* (2013.01)

(58) Field of Classification Search
CPC ............................... F24F 8/108; B60H 3/0608
See application file for complete search history.

(56) References Cited

FOREIGN PATENT DOCUMENTS

| | | | |
|---|---|---|---|
| DE | 3321612 | A1 | 12/1984 |
| WO | 02/42691 | A1 | 5/2002 |
| WO | 2007/134443 | A1 | 11/2007 |
| WO | 2008/119893 | A1 | 10/2008 |
| WO | 2017/098088 | A1 | 6/2017 |

OTHER PUBLICATIONS

International Search Report and Written Opinion of corresponding PCT application No. PCT/EP2021/083319 dated Oct. 3, 2022.

*Primary Examiner* — Allen R. B. Schult
(74) *Attorney, Agent, or Firm* — Elevated IP, LLC

(57) ABSTRACT

The invention relates to an air cleaning device, in particular, the invention relates to a supplementary air cleaning device which boosts delivery of clean air using energy from the existing air flow and from thermal updrafts to drive air through a filter. Moreover, the device is designed to create a localised extraction zone from just above the breathing zone of standing passengers. The device is mounted externally to an existing ventilation outlet such as may be found in a train, bus, or airplane, or in a building. The System for enhancing air filtration for public indoor or transportation spaces comprises an air inlet comprising an air inlet area; a reduced cross-sectional area zone comprising at least one nozzle (23) forming a floor of the mixing chamber the angle formed between the floor and the at least one nozzle is between 0 and 40 degrees.

19 Claims, 16 Drawing Sheets

AIR CLEANING DEVICE

CROSS REFERENCE TO RELATED APPLICATIONS

This application is a national stage application, filed under 35 U.S.C. § 371, of International Application No. PCT/EP2021/083319, filed Nov. 29, 2021, which claims the benefit of EP Application Serial No. 20210985.6, filed Dec. 1, 2020, entitled "AIR CLEANING DEVICE". The entire contents of the aforementioned applications are incorporated herein by reference.

The invention relates to an air cleaning device.

More concretely, the invention relates to a supplementary air cleaning device which boosts delivery of clean air using energy from the existing air flow and from thermal updraft to drive air through a filter. Moreover, the device is designed to create a localised extraction zone from just above the breathing zone of standing passengers. The device is mounted externally to an existing ventilation outlet such as may be found in a train, bus, or airplane, or in a building.

Public health demands methods to protect people from airborne transmission of disease in public spaces, and in particular methods to address risks encountered in public transportation and indoor spaces. In fact, people are advised by governments and health agencies to avoid public transportation due to poor ventilation, which is clearly detrimental to both transportation companies and the public. Enhanced ventilation lowers pathogen spread and reduces the transmission of airborne diseases. It is advantageous to trap bioaerosol particles produced by people close to their source, before they disperse into the area reaching other people. However, it is expensive and time consuming to rebuild existing infrastructure in order to boost the ventilation rate. Similarly, it is also necessary to provide a person with a supply of clean filtered air from which pollution has been removed including indoor air pollution, particles, and ambient air pollution.

Purification and ventilation devices known from the prior art comprise a broad range of specifications. The document U.S. Pat. No. 10,029,797B2 discloses a device for personal ventilation in an aircraft environment wherein each passenger is provided with an individual sphere of purified air to avoid cross-contamination. The document U.S. Pat. No. 9,375,547B2 discloses a personal air filtration device providing laminar filtered flow to the user. The document CN204077307U discloses a motor vehicle seat back equipped with an air purification unit. Similarly, the document U.S. Pat. No. 4,711,159A discloses a built-in vehicle air filtration system arranged to take air from the exterior of the vehicle and introduce it into the vehicle after filtration. These devices use mechanically driven components to propel the air through the devices. So-called 'bladeless fans' have been described such as CN201786778U and AU2012200112B2 in which the velocity of one air stream is used to entrain additional air into the flow. These systems boost air flow, with negligible or no filtration. CA2655553C describes systems for drawing air through an air treatment system using entrainment flow. The resulting air is then delivered to the ventilation system e.g. in an airplane or building; implementation requires modification of the central air handling unit which may be expensive or there may not be space for a large filter.

Some other purification and ventilation devices use ultraviolet rays to kill bacteria, viruses and mold, as described in EP 1688151 or WO 2004/101101. However, these systems also comprise a mechanically driven component, such as a fan, to propel air into the device and carry the purification before injecting it into the public/user space.

Devices of this kind might require a complex installation and sometimes involve profound modifications of the existing systems to integrate them. The aforementioned complexity of the state of the art devices requires a considerable investment to prepare the space where these will be mounted, a system to provide electrical power and regular maintenance to check moving parts and electronic components.

Further, said devices comprise mechanically driven components and/or electronic/electric circuits to accomplish their purpose, which contribute to making them expensive and hard to maintain. Further, devices with moving components will inevitably introduce undesired noise into the public space. Even more importantly, the addition of fans or other active propelling devices generates further turbulence and mixing in the environment, potentially spreading contaminated air.

WO2007/134443A1 to Boeing Co. discloses a passive purification device which is installed on top of an airplane gasper. The device has a cylindrical shape and has a filter wall and an outlet. The mixing chamber is substantially tubular, with a vertical main axis. The filter is located mainly on the lateral wall of the tube and the outlet is located on the centre of the lower basis of the cylinder. The device uses a considerable height, and the entrainment ratio depends on its height. Therefore, entrainment is limited by the existing suitable space. Moreover, due to the reduced horizontal surface of the filter, the device does not benefit from the thermal plume of the user, which reduces entrainment and allows pathogens to disperse without passing through the filter. Moreover, since the mixing chamber is cylindrical, it cannot cover a line air supply with a length of many meters.

WO2008/119893A1 and DE3321612A1 disclose passive purification devices wherein the cross sectional area of the mixing chamber is not reduced after having the mixture of primary and secondary flow. This results in having a negative pressure of way less than 5 Pascal. Moreover, the air coming through the filter does not enter immediately to the mixing chamber, which increases pressure losses and further diminishes the entrainment ratio.

WO2017/098088 A1 shows another passive purification device wherein the filters are arranged vertically and the outlet is on the upper part of the device. This unduly increases the air path and increases losses. As a consequence of its arrangement, the mixing length is so long that it causes momentum loss and blackflow from the outlet.

In all cases, the passive device can make a negative pressure over the filter media of less than 5 Pa.

It is an object of the present invention to provide means for enhancing air cleaning without some of the problems of the prior art by means of a passive air cleaning device.

More concretely, the present invention discloses a system for enhancing air filtration for public indoor or transportation spaces, which comprises an air inlet comprising an air inlet area, a reduced cross-sectional area zone after the air inlet area, and an air outlet body after the reduced cross-sectional area zone, said air outlet body comprising at least a wall and an air outlet, wherein at least a zone of the air outlet body wall is permeable and comprises an air filter for allowing air from the outside of the system to enter the air outlet body via the air filter, which solves the problems of the passive devices of the prior art.

Even more concretely, according to a first aspect, it is disclosed a system for enhancing air filtration for public indoor or transportation spaces, which comprises:

an air inlet comprising an air inlet area;

a reduced cross-sectional area zone after the air inlet area, the reduced cross-sectional area zone comprising at least one nozzle; and an air outlet body after the reduced cross-sectional area zone, said air outlet body comprising at least a wall and an air outlet, a mixing chamber located within the air outlet body wherein at least a zone of the wall of the air outlet body is permeable and comprises an air filter for allowing air from the outside of the system to enter the outlet body via the air filter;

the permeable zone being located on a lower face of the system and wherein the permeable zone is adjacent to the mixing chamber, giving direct access to the mixing chamber from outside of the system, so that the permeable zone forms a floor of the mixing chamber, the floor being preferably horizontal, and in that the angle formed between the floor and the at least one nozzle is between 0 and 40 degrees.

According to a second aspect, it is disclosed a system for enhancing air filtration for public indoor or transportation spaces, which comprises:

an elongated air inlet body comprising an air inlet and an air inlet area;

a reduced cross-sectional area zone after the air inlet area, the reduced cross-sectional area zone comprising at least one nozzle row; and an air outlet body after the reduced cross-sectional area zone, said air outlet body comprising at least a permeable wall which comprises an air filter, an upper wall and an air outlet, the air outlet being on an external surface of the system;

a mixing chamber located within the air outlet body wherein the system has a chamfer which reduces the cross section area of the mixing chamber until the air outlet.

The present invention can be used on top of a line of air supplies whose design is adaptable to different supply lengths. The present invention arrangement is optimized to have a minimum height while the entrainment ratio is the highest. The negative pressure obtained by the present invention and its preferred embodiments has been optimized and is the highest in comparison with the passive purification devices of the prior art. The present invention makes up to 10 Pa of negative pressure.

The reduced angle of the nozzles and the filter floor allows having the minimum possible height. Moreover, they also take full advantage of the so-called thermal body plume for increasing output and ensuring filtration of air potentially polluted with virus from a user.

The reduction of the cross sectional size of the mixing chamber prevents any backflow from the outlet, therefore maximizing the entrainment ratio. Preferably, the mixing chamber has the smallest cross-section area at the outlet. A chamfer is preferred so that the cross section area of the mixing chamber is continually reduced until the outlet.

The elongated body allows for the present invention to be easily adaptable to different supply air lines. In particular, the present invention can be placed over a long line diffuser supply.

The filter gives direct access to the mixing chamber, which minimizes momentum loss, increases the entrainment ratio and prevents backflow at the outlet.

The present invention can work with nozzles and outlets placed at one side or at both sides. The entrainment ratio is enhanced when nozzles are placed on opposite sides as well.

The air inlet body is preferably suitable for installation over the outlet of a supply air device, such as a supply air device of a public indoor space or public transport, and it can be arranged to form a sealed entity with the supply air device outlet. Therefore, when installed following this arrangement, the air coming from the supply air device into the air inlet body is forced to go through a reduced cross-sectional area that joins said air inlet with an air outlet body or outlet duct.

The passive air cleaning device of the present invention is based on the generation of a region with "negative pressure" (pressure lower than the device surroundings) inside the device. This is achieved by means of the shape of the internal air ducts arranged to receive an external inflow and to transform static pressure into dynamic pressure, which leads to air entrainment from outside the device. This occurs naturally since air flows from areas with higher pressure to areas with lower pressure, and therefore additional energy supplies are not needed. In addition, thermal updraft drives additional air through the filter. Advantageously, if the present device is installed in a ceiling, air quality can also benefit from the large scale flow created by convection due to differences in density between warm and cold air. These differences in air density might arise from body heat, heating devices or other sources of heat. More specifically, in a stagnant environment, exhaled warm air, which can be potentially contaminated, will flow naturally towards the ceiling of the room due to being less dense than the surrounding media, carried by its own heat and the thermal plume of body heat. Therefore, a filter located at the lowest part of the system or the present invention is highly advantageous. On the other hand, refrigerated clean air, which might be supplied through the device will flow naturally towards the ground of the room, following a recirculating airflow pattern. Further, this gentle one-way displacement flow leads to less potential airborne transmission of disease than a turbulent flow that mixes air.

Preferably, the air inlet area is greater than the reduced cross-sectional area. Therefore, the air—which remains incompressible throughout the device for these flow conditions—gains speed when flowing through said reduced cross-sectional area zone to keep the mass flow rate constant, and therefore the static pressure at this point drops. These two magnitudes (air speed and static pressure) can be easily estimated applying the continuity equation and Bernoulli's principle.

Air passes through the nozzles and is released into the mixing chamber over the filter as a jet. It is known that when an air jet is released into an stagnant air it pulls the surrounding air molecules simply due to viscosity, i.e. friction between air molecules of high velocity and stagnant air molecules. Due to this entrainment, a wake with a negative pressure of a few pascal is being developed which should be replaced by air molecules placed in or around filter media. Therefore the negative pressure over the filter causes an airflow from outside to the mixing chamber through the filter.

The entrained airflow and the airflow from the reduced cross-sectional area mix in the mixing chamber to form a clean air stream and exit through the air outlet at atmospheric pressure and with a velocity that depends on the devices internal geometry and the air velocity inside the reduced cross-sectional area.

To prevent air from outside from entering the outlet body through the air outlet it is advantageous to keep the velocity through the outlet high. To do so, preferably, the system has an element which reduces the cross-sectional area of the mixing chamber near the outlet. More advantageously, the area of the mixing chamber is reduced just at the outlet. Even more advantageously, the cross sectional chamber of the mixing chamber is minimal at the outlet. Preferably, the air outlet body has a chamfer which reduces the cross-sectional area of the mixing chamber next to the air outlet. More preferably, the chamfer is formed by a surface which forms an angle of between 110° and 160° with the upper wall of the mixing chamber. The outlet body might, alternatively, comprise a rounded internal protrusion between the end of the air filter and the air outlet. The height of said protrusion is preferably equal or smaller than 25% of the height of the outlet body. Further, the radius of curvature of this feature might be adapted for different output body geometries.

Advantageously, the mixing chamber has walls which continually reduce the cross-sectional area of the mixing chamber from the exit of said at least one nozzle until the air outlet.

The reduced cross-sectional area zone of the air cleaning device comprises at least one nozzle. Said nozzle can direct the airflow towards the air outlet so that energy losses are reduced. Further, the length of the nozzle is preferably 3 mm long and more preferably more than 10 mm, to ensure that the flow inside the outlet body and over the air filter is substantially parallel to the air filter surface. The length of the nozzle might vary for different outlet body geometries.

Different types of nozzles such as bell, conical or cylindrical nozzles can be used. The use of different nozzles allows modification of the cross-sectional area through which the air flows and therefore the airflow dynamic and static pressure. However, an important finding made in the present application is that circular cylindrical nozzles are greatly preferred. This may be due to the fact that they can ensure that the air flow at the end of the nozzles is parallel to the centre axis of the nozzle. Preferably, the nozzles are parallel to the upper wall of the mixing chamber.

Furthermore, the vertical distance from the nozzle to the top inner face of the outlet body is preferably less than 1 cm. A distance avoids the viscosity effect in the boundary layer, which is not dependent on the dimensions of the mixing chamber or the nozzle. In some embodiments, the distance can be greater than 1% of the total height of the outlet body. Although other vertical distances can be used it is advantageous not to exceed 25% of the height of the outlet body.

Further, the vertical distance from the nozzle to the air filter is preferred to be at least half of the total height of the outlet body. In addition, the nozzle's internal geometry might be optimized to reduce energy losses due to friction and/or turbulence.

Yet more preferably, the device is arranged to comprise a set of said nozzles.

Preferably, the system comprises a row of nozzles. More preferable, it comprises two parallel rows of nozzles on opposite sides of the air inlet area. The distance between the centres of the nozzles in a row is preferably of 1.5 to 3 times the nozzle diameter. In some embodiments, every other hole in a row has a reduced diameter. More preferably the reduced diameter is 50% of the non-reduced nozzle diameter. The distance between opposite rows helps to have a higher entrainment ratio through the filter media by allowing an increase of the air through the filter media and/or the effective area of filter media. The minimum distance between rows is preferably greater than 20 cm. A maximum distance between rows is preferable 30 cm or less, although it can also be greater.

In a preferred embodiment, the air inlet of the air cleaning device receives air from a heating, ventilation, and/or air conditioning (HVAC) system. In a more preferred embodiment, the HVAC device is conjoined with a public transportation or a building HVAC device.

The application of the passive air cleaning device of the present invention in conjunction with existing HVAC system allows trapping pollution near the source before it disperses more widely, extracting potential airborne contaminant particles from public spaces and providing a purified air stream. Further, this device can be installed to provide enhanced ventilation without electricity or severe modifications to the existing ventilation system. Furthermore, this device does not cause undesirable mixing due to turbulence effects, representing minimum disturbance for people in the vicinity of the device. This can be of great importance in applications with limited space, such as in the rapid transit system or in applications where quiet environments are required, as in offices, libraries, universities, schools, etc. In these environments users are near the HVAC systems and potential noise, vibrations and/or air currents coming from these or other peripheral systems would result in an unpleasant experience.

The applicability of the device of the present invention together with available HVAC air circuits renders its installation as a fast and simple procedure, without the need of additional fans, power supplies or large free spaces. This is particularly advantageous for applications with limited space and/or limited power supplies, such as public transport.

Another advantage of the present invention is that the enhanced filtration comes with a very low cost, maintenance and energy consumption, making it ideal for long term installations. In fact, the energy consumption of the system per se is zero and the maintenance is limited to the replacement of the filter bodies periodically.

Advantageously, the air inlet of the air cleaning device comprises an air inlet body. This air inlet body can improve the air distribution towards the nozzle or nozzles. The inlet body is preferably elongated, so that it can cover an air supply line. Preferably, the air inlet body has a constant cross sectional area which develops along a line.

The outlet body comprises one wall with a permeable region. Even more advantageously, the outlet body comprises two walls, one of which is permeable. Yet even more advantageously, the outlet body comprises four walls, of which at least one is permeable. The length and width of the outlet body can be defined so as to benefit from a large surface area with air entrainment. Preferably, the outlet body has a constant cross-sectional area which develops along a line. More preferably, the air flow from the air inlet area to the air outlet is parallel to said cross section. These dimensions can be adapted depending on the pressure difference required and the configuration of the reduced cross-sectional area zone. Further, the outlet body can comprise internal walls to define a more progressive flow expansion from the reduced cross-sectional area zone to the air outlet. These walls, if installed together with a set of nozzles, or orifices, can also isolate the entrainment effects of one nozzle, or orifice, over the others.

As previously discussed, the outlet body, or outlet duct or mixing chamber is delimited by at least a wall with a permeable portion. This permeable wall portion can be equipped with an air filter. To ease maintenance and installation the outlet body might comprise one permeable wall, whereas the other delimiting walls might be made of solid impermeable material.

Preferably, the permeable zone of the outlet body is located at a lower zone of the air cleaning device to benefit the most from natural convection flows due to existing density gradients inside the public space. More preferably, it is located on a lower face of the device. Advantageously, the permeable zone is located in a lowest and outermost area of the system. Preferably, the permeable zone is disposed horizontally. Even more preferably, the outlet body of the present device is arranged to surround a set of nozzles. Yet more preferably, the outlet body comprises means to fasten and secure the air filter. These means can comprise threaded holes, guides, clamps or elastic straps among others.

Thus, the air injected into the outlet body travels along said body following the least resistive pathway to reach the corresponding air outlet and into the atmosphere.

Advantageously, the difference in pressure generated inside the outlet body by the injected airflow can be used to induce flow from the outside in, through the permeable filter. In case the permeable layer is changed due to the need of a different filtering requirement, the cross-sectional area zone, as for example the sum of all nozzle exit areas, can be modified, in this case by replacing the set of nozzles, and therefore changing the pressure difference between the pressure within the outlet body and the indoor space.

Preferably, the air filter of the air cleaning device might use any filtration technology including but not limited to high-efficiency particulate air (H EPA) filters, charcoal gas filters, fibrous particle filters, UV based filters or electrostatic precipitator filters, or a combination thereof, although other filters known in the art might be used. More preferably, the air filter is a particulate filter, a gas filter or a combination of both.

The size of the filter can be selected so that the flow from the reduced cross-section area or nozzles does not impinge on the air filter surface. For example, the angle between a straight line connecting a bottom wall of a nozzle with an air filter point closest to the air outlet and a horizontal line is preferably greater or equal to 8 degrees. This angle can be used to estimate the maximum length of the air filter, and therefore prevent nozzle flow from impinging with the air filter.

In some embodiments, the angle formed between the floor of the mixing chamber and the at least one nozzle is between 20 and 40 degrees. Also advantageously, the upper wall of the mixing chamber forms an angle different to zero with the floor of the mixing chamber.

Advantageously, the air outlet has an elongated, rectangular shape. Also advantageously, the air outlet has a cross sectional dimension (or height) which is at least 1.5 times the diameter of the nozzle.

To prevent backflow, the outlet and the permeable zone are preferably separated a distance by means of non-permeable material. More preferably, said distance is between the diameter and half the diameter of said at least one nozzle. Preferably, a frame of material non-permeable to air separates the outlet and the filter. The frame can cover the filter next to the outlet.

Similarly, the thickness of the filter and other filter specifications can be chosen according to the requirements of the concrete application of the device.

More preferably, the air filter comprises a plurality of filtration layers that can be selectively installed and uninstalled for cleaning and maintenance purposes.

Even more preferably, the air filter is contained within a structure that is clamped or fastened to the permeable wall.

Yet more preferably, the structure slides into guides that are formed on the outlet body so that the entire permeable wall zone is covered with the air filter.

Further, more advantageously, the air cleaning device comprises means for securing it to the ceiling, which include ceiling hooks, anchor bolts or any other means known in the art.

The present invention also discloses a method for enhancing air filtration in a building or a vehicle which comprises providing an airflow and placing the air cleaning system of the present invention so that the airflow enters the system via the air inlet body of the system. More preferably, the method comprises the supply of the airflow by a HVAC device as previously discussed. Even more preferably, the method for enhancing air filtration in a building or a vehicle comprises the placement of the system in a ceiling of a building or a vehicle.

The present invention further discloses the use of the air cleaning device for enhancing air filtration in a building or in a vehicle. More preferably, the air cleaning device is located in a ceiling of said building or vehicle.

The present invention further discloses a vehicle comprising the air cleaning device of the present invention. More preferably, the vehicle is a public transport vehicle.

The present invention can be installed to any supply outlet inside different enclosures such as train carriages, bus cabins, car cabins and inside buildings. By adding the present invention to an air outlet of these enclosures it is possible to remove the filtration unit of the HVAC system of that enclosure, since it may not be necessary to have central filtration anymore. This results in having a novel air cleaning system where the filtration media is located inside the enclosure, but not in the HVAC system.

Unless defined otherwise, all technical and scientific terms used herein have the same meaning as commonly understood by one of ordinary skill in the art pertinent to devices described. As used herein, the following terms and phrases have the meanings ascribed to them unless specified otherwise.

The term “nozzle” refers to a body that directs the flow in a certain direction, independently of the internal and/or external geometry. The term “permeable” refers to air permeability. The term “negative pressure” refers to a pressure magnitude smaller than the atmospheric pressure during use. The term “dynamic pressure” refers to the kinetic energy per unit volume of a fluid ($\frac{1}{2}\rho v^2$), the term “static pressure” refers to the pressure exerted by a fluid that is not moving or flowing, and the term “total pressure” is the addition of dynamic and static pressure; this quantity is conserved along a streamline as long as there are no energy losses. The term “entrainment” refers to the transport of fluid across an interface between two bodies of fluid by a shear induced by a flow stream.

For a better understanding, drawings of an embodiment of the equipment to which this invention relates are appended by way of an explanatory but no limiting example.

In the figures, identical or equivalent elements have been given the same reference numerals.

In all figures, the filter bodies have been illustrated as solid bodies to simplify figures and reduce clatter. However, these bodies should be understood as permeable elements or substrates through which air can flow.

Figure 1:
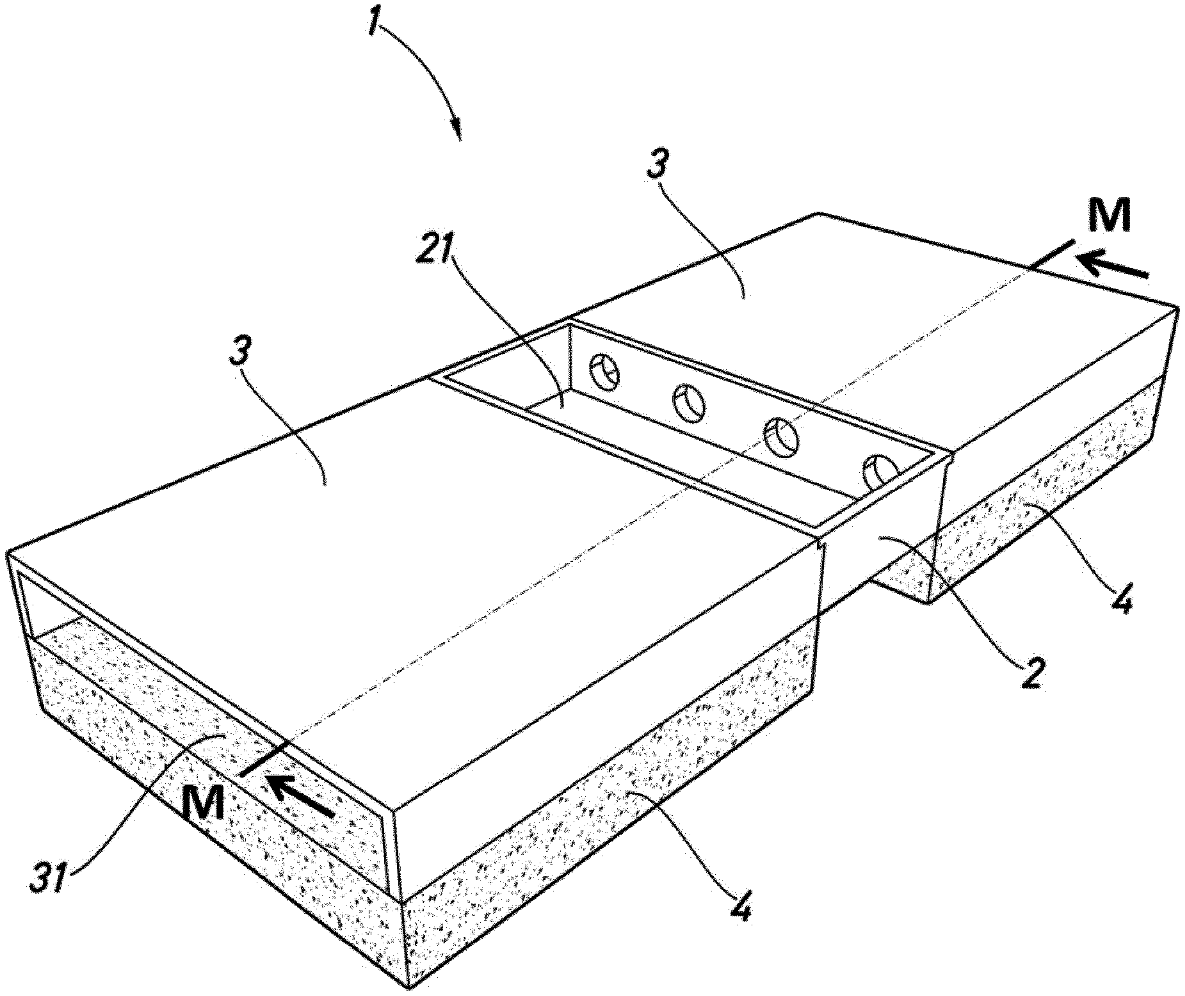
FIG. 1 shows a perspective view of a passive purification air device of the present invention.
Figure 2:
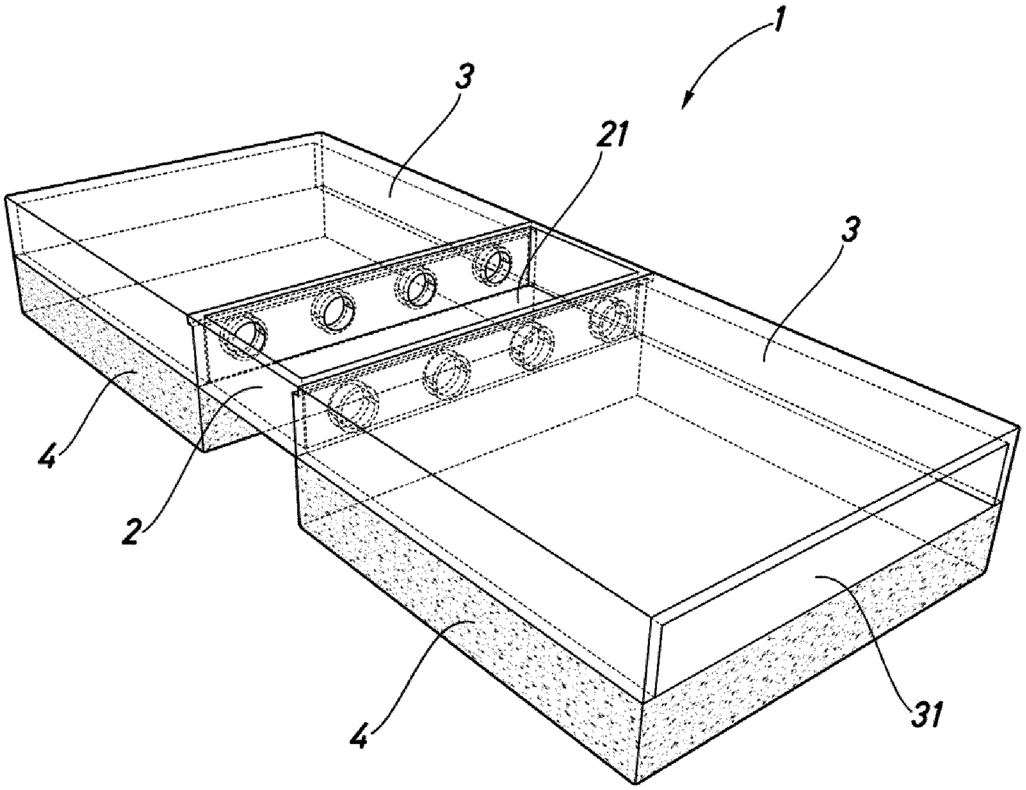
FIG. 2 shows the same view of a passive purification air device as in FIG. 1 but with hidden lines represented as dotted lines.

FIGS. 1 and 2 illustrate an exemplary embodiment of the device of the present invention 1. FIG. 2 includes the device hidden lines, which are represented with dotted lines to visualize the internal geometry and arrangement of the device components. The device comprises an inlet body 2, two output bodies 3 and two filter bodies 4. The output bodies 3 and the upper surface of the filter 4 define a mixing chamber. The upper surface of the filter forms a mixing chamber floor. Preferably, said floor is horizontal.

As illustrated in FIGS. 1 and 2, the inlet body is intended to receive airflow through the inlet area 21. Said airflow will then flow laterally through the circular cylindrical nozzles to the two outlet bodies 3 and towards the air outlets 31. The geometry of the device is designed so that to force the incoming flow from the inlet 21 to accelerate while travelling through the nozzles as a consequence of a reduction in cross sectional area 23. Following Bernoulli's principle, this leads to a drop in static pressure. The now accelerated incoming flow enters the output bodies 3, which selected dimensions allow the accelerated flow to create a negative pressure region with respect to the atmospheric pressure outside the device 1. Now, since the pressure differential is greater than the pressure drop that experiences an airflow through the filter 4, the air outside the device is entrained and cleaned as it goes through it, reaching the inside of the air output body, mixing with the incoming airflow and being delivered as a clean air stream through the outlet 31.

Figure 3:
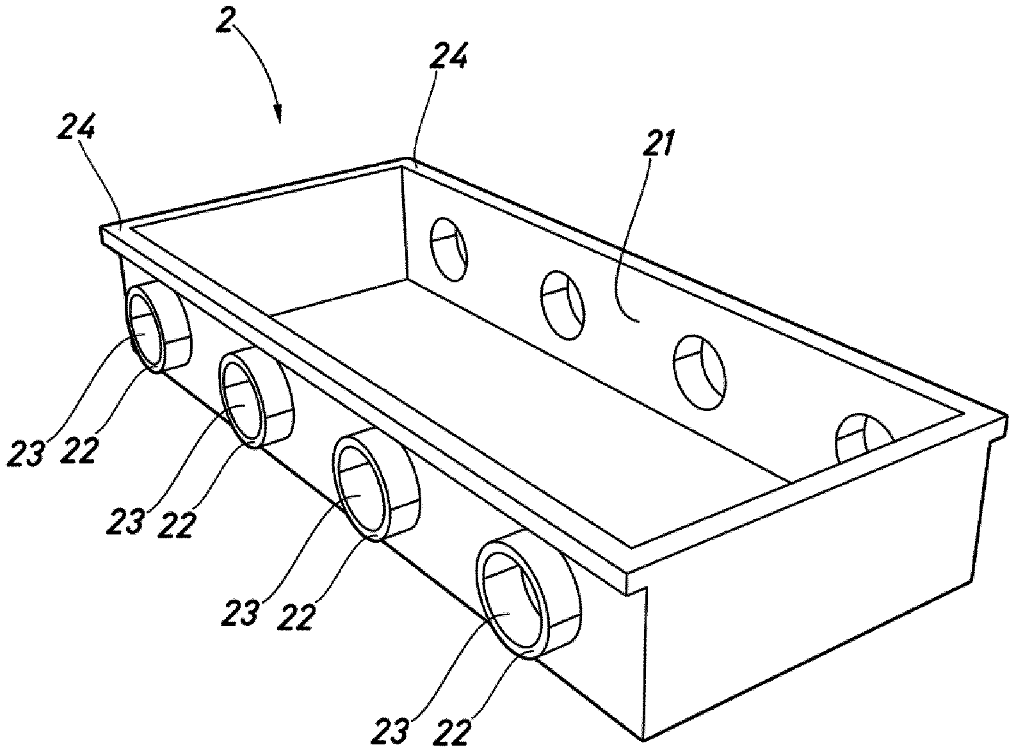
FIG. 3 shows a perspective view of an inlet body of the passive purification air device of the present invention.

FIG. 3 shows the inlet body 2 of the exemplary embodiment shown in FIGS. 1 and 2. The inlet body 2 comprises five rigid and solid walls defining an open chamber with an inlet area 21 to receive airflow. Further, the inlet body 2 is equipped with a set of circular cylindrical nozzles arranged longitudinally on two of the rigid walls. When the inlet body 2 is placed in the device 1, said nozzles 22, which have a nozzle exit area 23 smaller than that of the inlet area 21, connect the inlet body with the outlet bodies, forcing the flow to accelerate in order to keep the mass flow rate across the system. Other types of nozzles such as conical or bell shape nozzles could be also used to modify the flow speed at the nozzle exit and throughout the air outlet body, and to provide greater or smaller negative pressure and associated air entrainment. The inlet body 2 also comprises lateral flanges to rest on the outlet bodies to ease the installation of the device. Despite the inlet body has been represented with four nozzles per lateral side, any other number of nozzles or arrangements are also possible.

Figure 4:
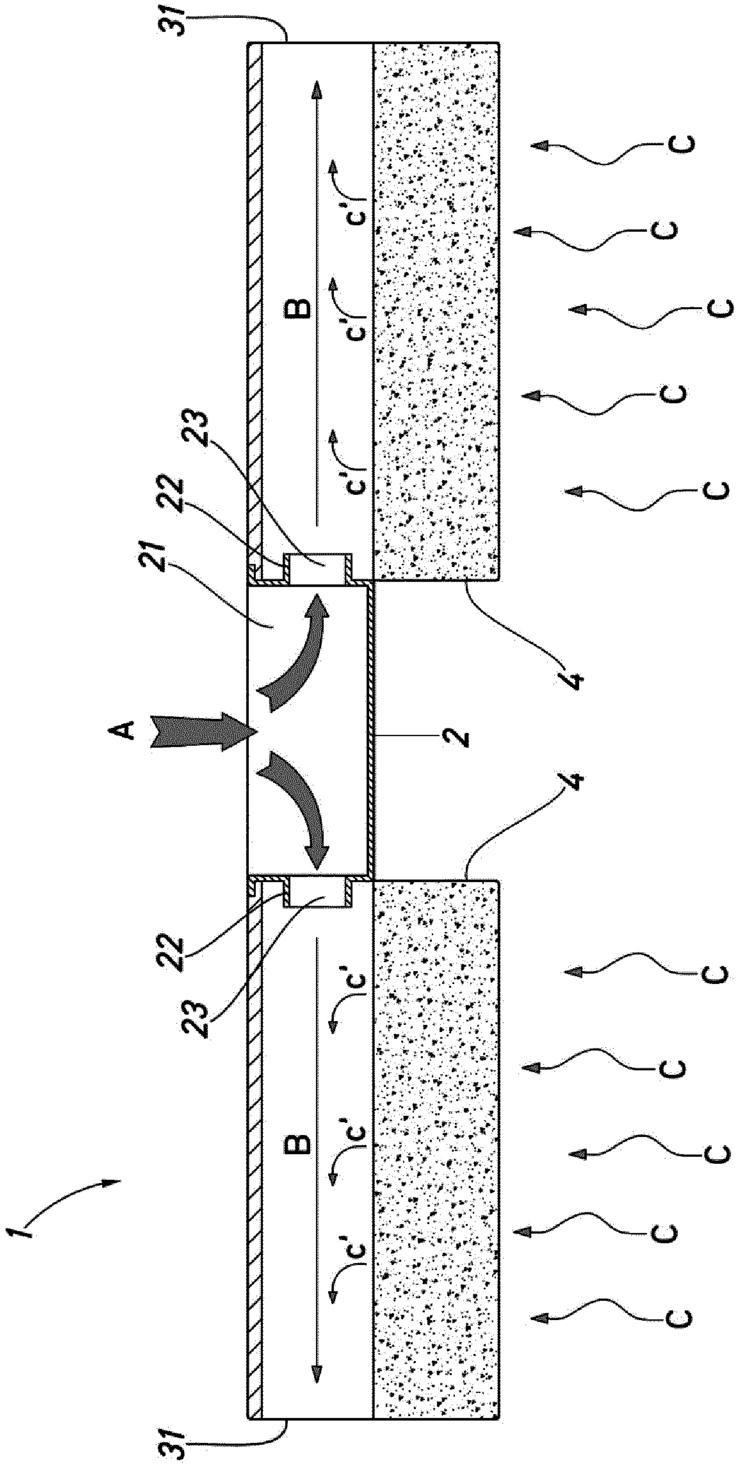
FIG. 4 shows a front view of a cross section of the passive purification air device through the plane MM

FIG. 4 shows a cross section of the device through the plane MM defined in FIG. 1. Further, FIG. 4 shows the airflow distribution around and inside the device, represented with Latin letters. Thus, FIG. 4 shows the incoming airflow A entering the air inlet 2 through the air inlet area 21. Then, the airflow in the air inlet 2 exits through the nozzles 22, with a nozzle exit area 23 smaller than the air inlet area 21. Thus, applying the continuity principle and considering the airflow to be incompressible under these conditions, a reduction of cross sectional area leads inevitably to an increase in mean flow velocity. This accelerated flow B enters the outlet body 3, filling said body after the sudden expansion and generating a region with negative pressure. This drop in static pressure can be easily estimated applying the continuity equation and Bernoulli's principle, as previously discussed. Further, computational methods can also be used for better precision. This pressure difference, or negative pressure, forces air C from the outside to go through the filter 4 into the outlet body 3. Once inside the outlet body, the now clean air C' is further entrained by the air streams coming from the nozzles 22, and travels towards the air outlet 31 enhancing the delivery of clean air.

Figure 5:
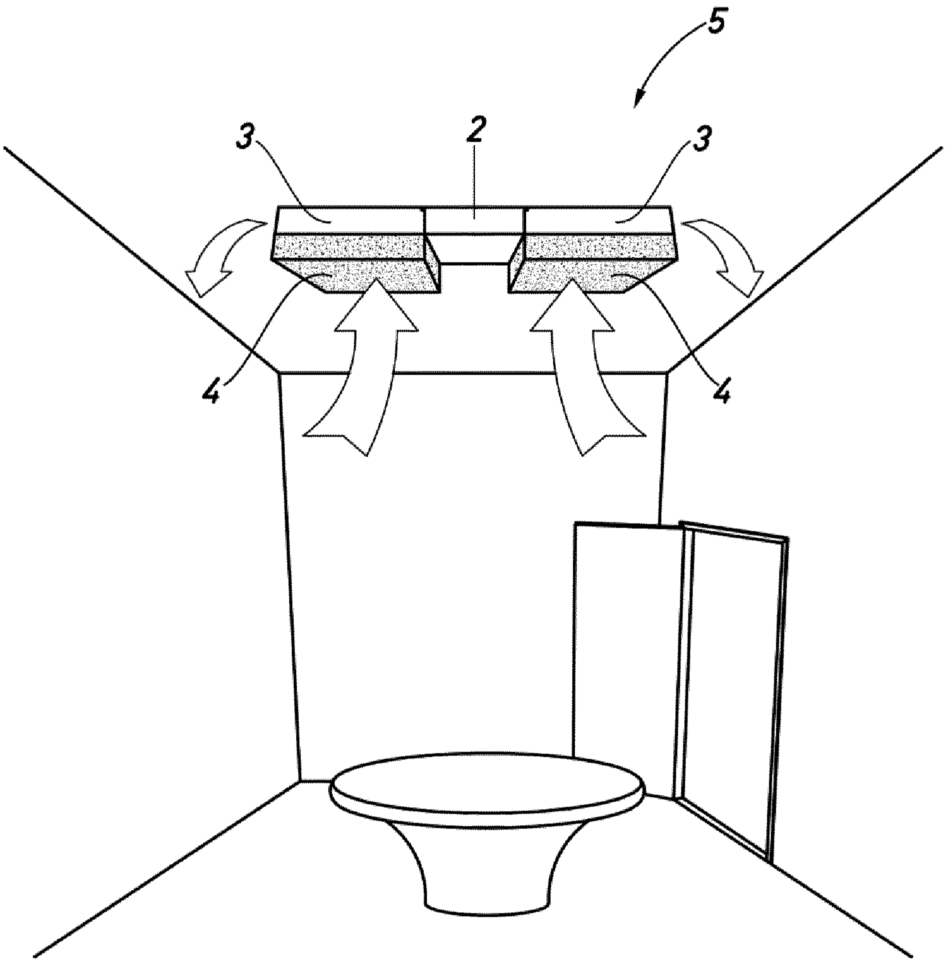
FIG. 5 shows a passive purification air device according to the present invention installed in the ceiling of an indoor space.
Figure 6:
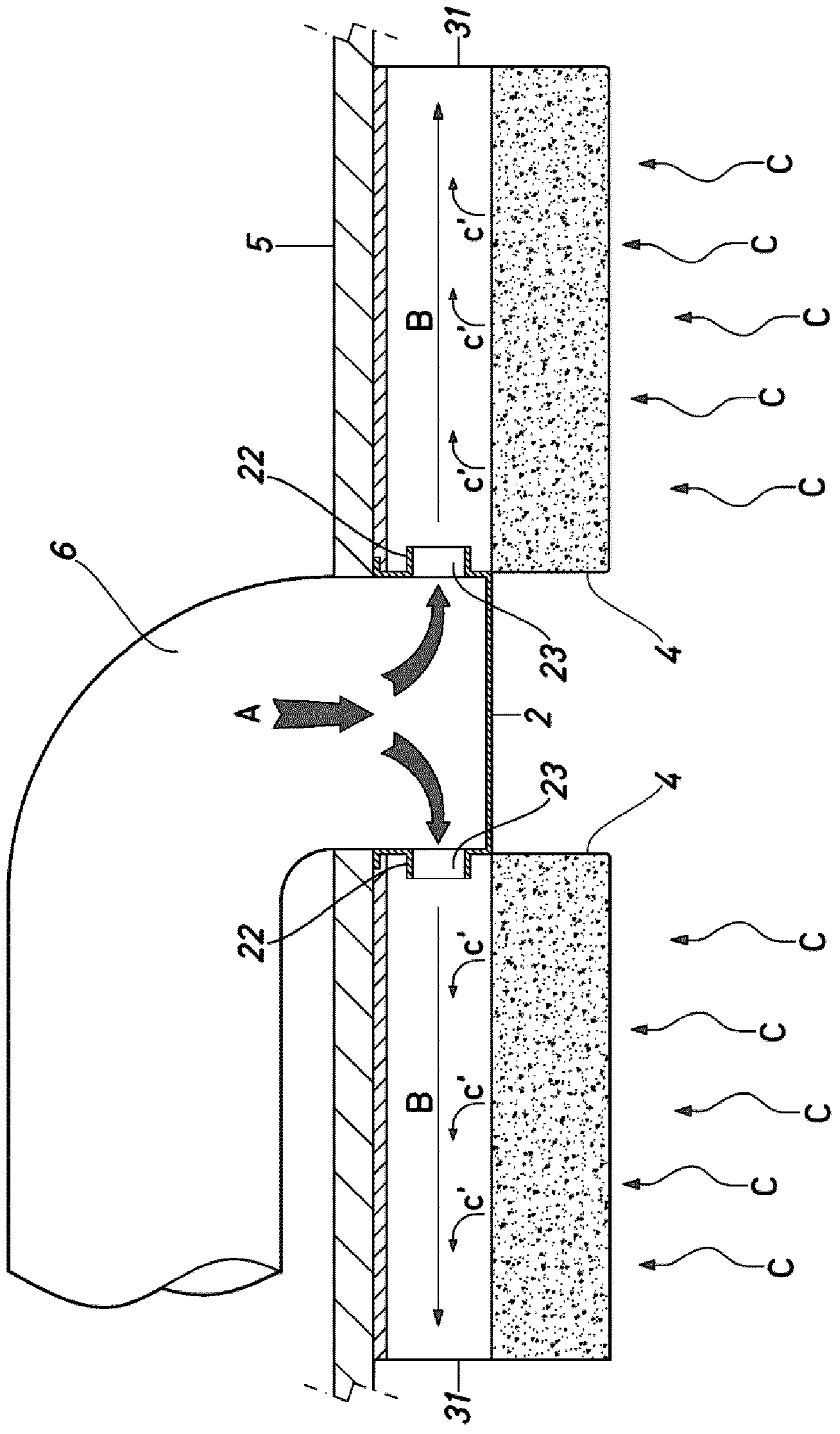
FIG. 6 shows a cross section of the installation of the passive purification air device shown in FIG. 5.

FIGS. 5 and 6 illustrate the arrangement of a passive purification air device of the present invention on the ceiling of an indoor space. FIG. 5 shows in a perspective view the device installed, with a minimal visual impact. Moreover, when the device is installed on the ceiling, the entrainment of the air from the room is further enhanced by natural convection streams cause by density gradients due to temperature. Thus, refrigerated air from device 1, with a higher density than the average room air density will naturally flow towards the ground due to gravity. On the contrary, breathed warm air, with a lower density than the average air density will flow away from the ground towards the ceiling. Thus, the installation of the device of the present invention in a room with air conditioning will not only enhance the air filtering but will also perform a selective filtering, for which the warm buoyant air is more likely to be entrained by the system. This allows filtering and removing potential contaminants contained in the breathed warm air from the room without inducing turbulence. This represents a very important feature of the present invention compared with the prior art, since the use of extraction means which induce turbulence are actually mixing potential contaminants with clean air and difficult the removal of these from the room.

FIG. 6 illustrates a cross section of the device installed through the plane MM defined in FIG. 1. This figure shows that the system can be installed to receive clean air A from existing heating, ventilation, and air conditioning (HVAC) systems 6. This allows a simple and quick installation. Although the specific approach to install it might differ from case to case depending on the existing HVAC system, the general procedure is simple and comprises dismounting the outlet trim of the HVAC system, placing the system so that the inlet body is located in the outlet orifice of the HVAC system and securing the device to the ceiling. The original appearance of the HVAC system will not be much affected, since the inlet body is of the same dimensions of the HVAC outlet and the outlet bodies can be designed to be slim and streamlined to integrate smoothly within the ceiling.

Figure 7:
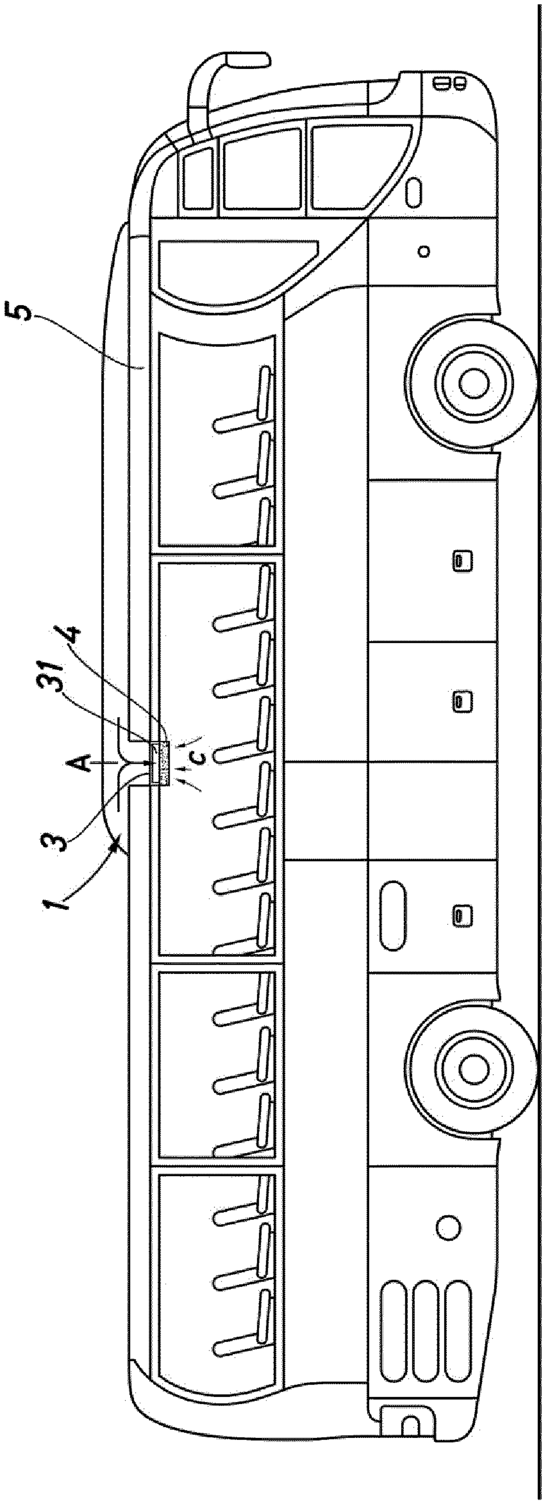
FIG. 7 shows schematically the installation of a passive purification air device in a bus.
Figure 8:
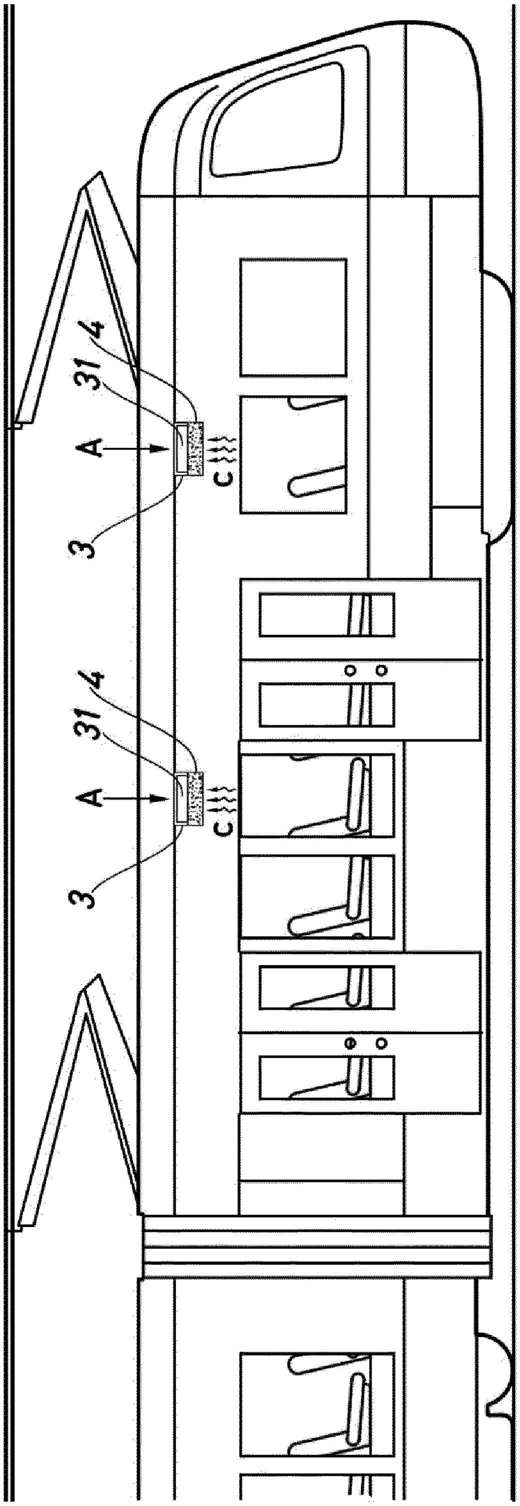
FIG. 8 shows schematically the installation of two passive purification air devices in a train carriage.

FIGS. 7 and 8 illustrate schematically the device of the present invention installed on the ceiling of a bus and a train carriage. The device of the present invention is particularly effective in this type of scenarios, where the distance between the source of potentially contaminated air is relatively closed to the device itself and the natural convention of warm breathed air guides said contaminated air directly into the vicinity of the device, where the pressure difference is able to entrain said air and filter it before returning it back once it is cleaned to the public space.

In the embodiments shown in FIGS. 7 and 8, the device is arranged in order to have the air outlet 31 facing lateral walls or windows of the bus/train carriage. This arrangement is particularly advantageous to both provide clean air across the public space and to entrain breathed air C expelled directly below the device. Moreover, other arrangements are also possible.

FIG. 7 shows that the device of the present invention can be mounted using the existing HVAC system of the bus. The HVAC system is mounted on the top part of the vehicle and in the present case it only comprises a single air outlet. Thus, the installation of a single system of the present invention will suffice to cover the entire air supply. In FIG. 7, the passive air purifier is installed beneath the HVAC but this is simply because in the present case the HVAC system and the air outlet of the HVAC system are located one over the other. Other configurations might be possible, but to minimize installation costs, time and area footprint, the purification device is recommended to be installed in the vicinity of existing HVAC system outlets.

Although the device in FIG. 7 has been shown to be connected to an air duct running across the roof 5 of the bus, multiple such devices can also be installed in a bus. In fact, it is advantageous to install a device over every seat using existing air outlets such as individual gaspers or using a vent system running along the length of the bus.

FIG. 8 shows the device of the present invention mounted using existing HVAC systems in a train carriage. As in the previous figure, the device of the present invention is mounted on the ceiling of the public transport, in this case a train carriage, to benefit also from buoyancy effects due to air density gradients. This figure shows the installation of two devices, one for each HVAC outlet.

Although the devices in FIG. 8 have been shown to be connected to two particular points within the train, multiple of such devices can also be installed in a train carriage. In fact, it is advantageous to install a device over every row or sub-row of seats using existing air outlets such as individual gaspers or using a vent system running along the length of the bus.

Figure 9:
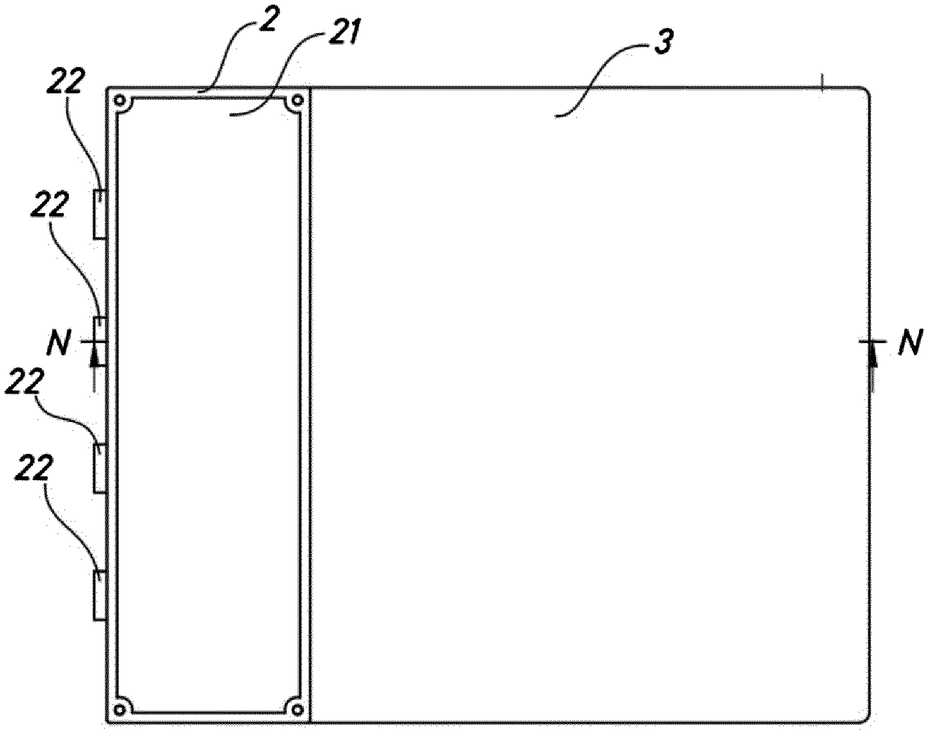
FIG. 9 shows a top view of a second embodiment of the passive purification air device of the present invention. Only one of the two output bodies has been depicted.

FIG. 9 shows a second embodiment of a passive air purification device according to the present invention. Only one of the two output bodies 3 has been depicted to reduce clatter. FIG. 9 also shows an air inlet body 2 comprising an air inlet area 21 and four nozzles per side that connect the inlet body 2 with the outlet body 3.

Figure 10:
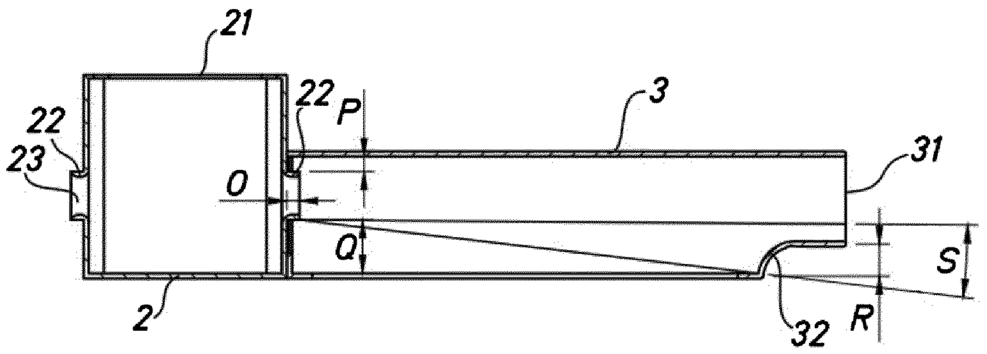
FIG. 10 shows a cross section of the passive purification air device of FIG. 9 through the plane NN.

FIG. 10 shows a cross sectional view of the embodiment shown in FIG. 9 through the plane NN. This figure illustrates how the inlet body 2 is connected to the outlet body 3. More specifically, in this embodiment the length O of the nozzle 22 is preferably 3 mm long to ensure that the flow inside the outlet body and over the air filter (not shown in the figure) is substantially parallel to the centre axis of the nozzle. In this case, this ensures that the flow through the mixing chamber is perpendicular to a normal axis of the air filter surface. However, the length O of the nozzle 22 might vary depending on different device geometries. Moreover, the outlet body 3 in FIG. 10 comprises a rounded internal protrusion 32 or fillet curve of height R between the end of the air filter and the air outlet 31, to keep the air outlet velocity high and prevent air from outside from entering the outlet body 3 through the air outlet 31. The internal protrusion reduces the cross sectional area of the mixing chamber near the outlet. Said height R is preferably equal or smaller than 25% of the height of the outlet body 3. The radius of curvature of this feature might be adapted for different output body geometries. Further, in this preferred embodiment, the vertical distance P from the nozzle 22 to the top inner face of the outlet body 3 is preferably less than 1 cm. It can also be, preferably, greater than 1% of the total height of the outlet body 3, if the dimensions so allow. Although other vertical distances can be used it is advantageous not to exceed, in any case, 25% of the height of the outlet body 3. Furthermore, the vertical distance Q from the nozzle 22 to the air filter is preferred to be at least half of the total height of the outlet body 3. In addition, the angle S between a straight line connecting a bottom wall of a nozzle 22 with an air filter point closest to the air outlet 31 and a horizontal line is preferably greater or equal to 8 degrees to prevent nozzle flow from imping with the air filter.

Experimental Test of Prototypes and Fluid Flow Modeling

A first physical prototype of a device according to the invention was tested in the laboratory.

The test system included a 2 $m^3$ test chamber with the prototype attached to the roof. A conduit was connected to the chamber leading to an external fan connected in a recirculating fashion to blow air into the device. The flow through this system was set to low or high, nominally 40 and 80 $m^3$/h respectively. Ammonium chloride particles were introduced into the chamber and the decay rate of the particles in size range PM2.5 measured using a device named Airnode by Airlabs. Using this system we were able to test the effect of different filter configurations relative to the removal rate for no filter present in the device.

The 'Basic filter' experiment shows the amount of air that is drawn through the system comprising an extended post-nozzle zone. The G4 and F7 filter experiments show the effects of different filter categories on the cleaning rate, at a high and a low flow speed. The final pair of tests in the table show that more air goes through the F7 filter system when there is a 130 W heat source 1 m below the filter, the heat source being approximately equal to a human metabolism.

| Experiment | Flow/ ($m^3$/hr) | CADR/ ($m^3$/hr) | Background CADR/($m^3$/hr) | CADR ratio/% |
|---|---|---|---|---|
| Basic filter | 42 | 15.4 | 11.6 | 32.7 |
| G4 filter | 44.5 | 18.7 | 14.2 | 28.6 |
| G4 filter | 91.4 | 34.2 | 26.6 | 31.6 |
| F7 filter | 85.4 | 36.8 | 26.6 | 38.3 |
| F7 and 130 W heater at 1 m | 83.4 | 32.5 | 21.5 | 51.1 |

Background CADR refers to the background clean air delivery rate of the test chamber (no flow introduced within the chamber).

G4 and F7 refer to filter classifications according to EN779:2012.

Computational Fluid Dynamics (CFD) simulations were run using commercial software to optimize the geometry in terms of the induction ratio and air cleaning performance. The simulations were run using the energy solver, compressible air, gravity, and temperature. The equations were solved for the k-epsilon turbulence model. The invented product was simulated in a chamber with size and geometry similar to the size and geometry of train carriage. In the model, the invention was attached to a supply diffuser (the diffuser is analogous to the supply flow of air 'A' in FIGS. 4, 6 and 7). A certain amount of the air was supplied through the supply diffuser to the room. CFD simulations were for a number of flow rates and for different sizes of the geometry. The simulations included simulating the filter media to ensure that reliable results were obtained. The CFD simulations were repeated for different filter grades to determine the induction ratio with different pressure drops over the filter media.

Based on these simulations, a revised design was created and the performance improved, both in the simulation and based on tests of a prototype. In the revised design the nozzle is directed downwards from horizontal at a certain angle such that the air is directed toward the outlet. Depending on the location of the nozzle above the filter, this angle may change to send the air to the outlet. The effect achieved by this geometry is that the flow gets closer to the filter as it moves to exit the device. The outlet is narrowed to keep the velocity high. Taken together, this maximizes performance and acts as an obstacle for outside air, so it cannot enter the mixing box. The diffusers will be circular with rounded edges at their inlet. They may have a length of a few millimeters or more and a diameter of more than 10 mm and less than the cross sectional area of the flow. The air coming from the nozzles should not hit the filter. Therefore, the nozzles will have an angle to ensure that the air jet will go out directly, without hitting the filter. The center to center distance between diffusers is at least two times of the diameter of each diffuser. Diffusers are placed above the filter at the mixing box and one side is connected to the supply air duct. Based on the simulations, the invention could entrain air equivalent to 50% of the supplied air through the diffuser. The simulations showed increased performance when the buoyancy effect was taken into the consideration.

Laboratory tests of the next generation prototype demonstrated an induction ratio of 50+/−5%. and a clean air delivery ratio of 42+/−5%.

Figure 11:
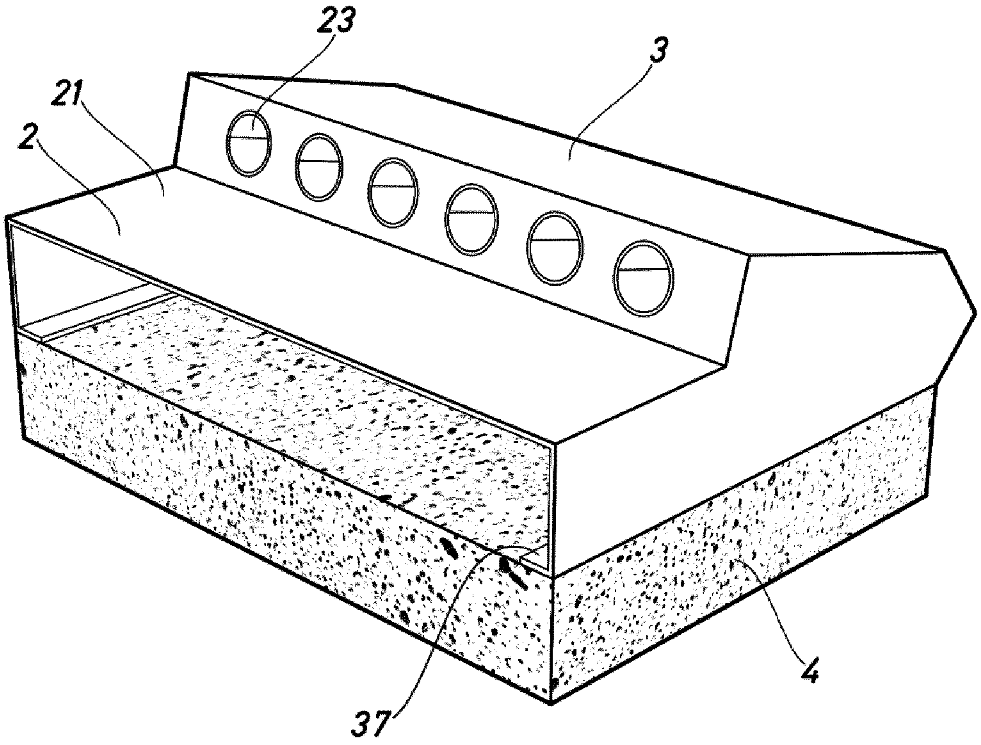
FIG. 11 shows a perspective view of a passive air purification device.
Figure 12:
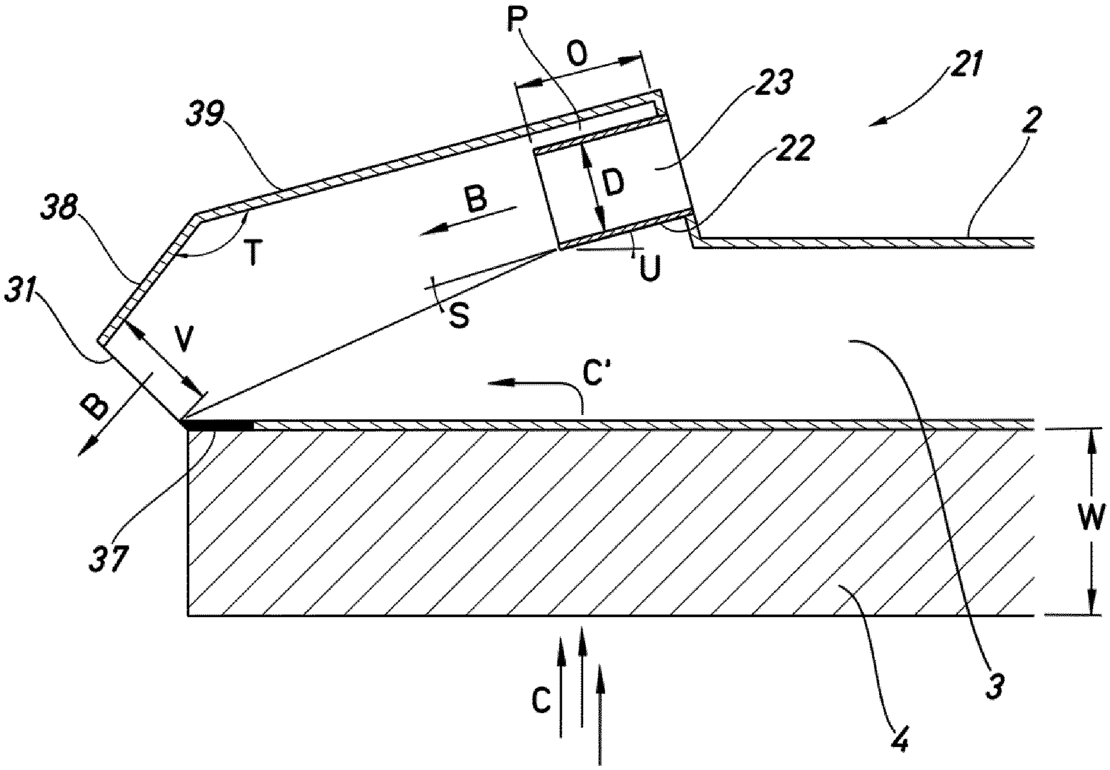
FIG. 12 shows a cross section of the device of FIG. 11.

FIGS. 11 and 12 show a device which is to be used on top of a line air supply. Identical or equivalent elements have been given the same reference numerals. Therefore, these elements would not be described in detail.

This device optimizes the obtained negative pressure. For example, when the nozzle diameter D is 12 mm, the device of FIGS. 11 and 12 creates a negative pressure of around 10 Pa over the filter media, which is higher (more than double) than the other designs of the passive devices of the prior art.

The device comprises a main body which forms the outlet body 3 and an inlet body 2, circular cylindrical nozzles 22 and a filter media including gas and particle filters 4. The walls of the outlet body 3 and the filter 4 defines a mixing chamber located within the outlet body. Due to the shape of the main body, the inlet area 2 has a prismatic, elongated shape. This system design can be extended along with any air supply by elongating the bodies and increasing the number of nozzles. An embodiment using the design of FIGS. 11 and 12 can be adapted to be installed at the air supply of a train carriage at the ceiling. In such a case, the length of the device can be more than ten meters, and can include hundreds of nozzles. In the figures, only six nozzles have been shown. The nozzles 22 form a row. In order to allow proper vision of the elements, a wall closing the outlet body 3 and the inlet area 21 has been omitted. This wall could be part of the device, or belong to the train, vehicle or building onto which the device is installed can be used.

FIG. 12 shows the inner elements of the device. The following element dimensions and/or angles and/or ratios between element dimensions relations optimize the negative pressure of the device and/or the entrainment ratio and have been determined by tests and/or computational simulations. However, each optimized element can be implemented in isolation, independently of the other.

The direction of the centre axis of the nozzle 22 is parallel to the upper wall 39. The nozzle 22 is preferably at a distance of less than 1 cm from the upper wall. This avoids the viscosity effect in the boundary layer, which is not dependent on the nozzle's diameter D. Preferably, the length O of the nozzle is greater than the diameter D of the nozzle. Also preferably, the length of the nozzle is equal to or less than two times the diameter D of the nozzle.

The filter 4 forms an angle U with the central axis of the nozzle D of less than 40° in order to minimize the system's height and avoid impingement of the air flow onto the filter. Preferably, the angle U of the device shown is between 20° and 40° C. Preferably, the floor of the mixing chamber is horizontal, in order to benefit from the thermal updraft. Therefore, the angle U can alternatively be preferably defined as the angle between the centre axis of the nozzle and the horizontal.

A mixing chamber follows the nozzle 22. In this case the mixing chamber extends from the end of the nozzle 22 to the air outlet 31 and its cross sectional area is defined by the upper wall 39, the front chamfer 38 and the filter 4, which forms a floor of the. Since the upper wall 39 forms an angle different to zero with the floor, the cross sectional area of the mixing chamber decreases progressively. The front chamfer wall produces a steeper decrease of the cross sectional area of the mixing chamber, enhancing the negative pressure created by the system and preventing backflow. The length of the front chamfer 28 is preferably more than 1.5 times the nozzle diameter D. The chamfer angle T is preferably between 110 and 160°. After the upper wall 39 finishes and the front chamber 38 starts, so that the cross-section area is reduced until the outlet has the smallest cross-sectional area size. This reduction prevents any backflow from the outlet, therefore maximizing the flow rate through the filter.

The air outlet 31 has a rectangular, elongated shape. The cross sectional height V of the air outlet 31 is greater than the nozzle diameter D.

A filter top frame 37 is situated at the bottom of the air outlet 31 and forms a strap on top of the filter. It is made of a material which cannot be penetrated by air, for example, a metal or some plastic. Preferably, it separates the outlet and the filter floor at least half of the diameter D of the nozzle to prevent backflow through the outlet and prevent direct flow of the air from the air nozzles 22 to the filter 4.

The filter 4 height may vary depending on filter type and filter area. The filter media may comprise both particulate filter and gas filter or any of them individually. For example, the filter 4 may be comprised of a pleated filter with pleats of two to four pleats per centimetre. The filter material used in the pleated filter may comprise both gas filter and particle filter.

Figure 13:
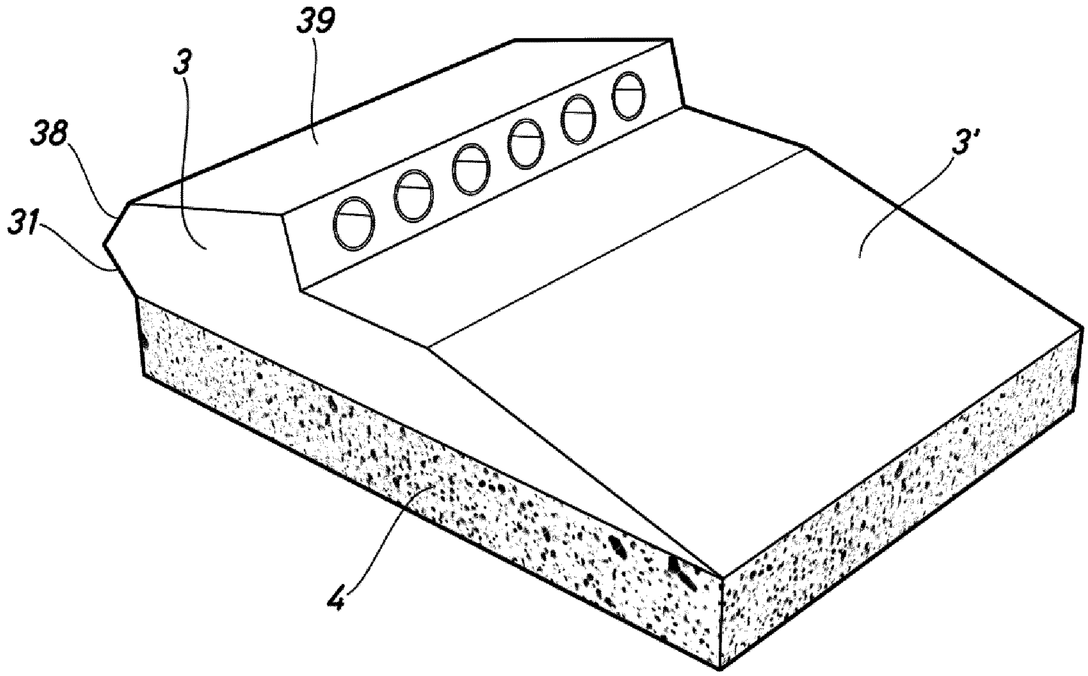
FIG. 13 shows another passive air purification device.

FIG. 13 shows a variation of the device of FIG. 11-12 wherein the filter media size and the corresponding bodies and frames have been extended to maximize the airflow rate through the filter media. The output body 3 and the mixing chamber extend into a triangular extension which covers the extended filter 4.

Figure 14:
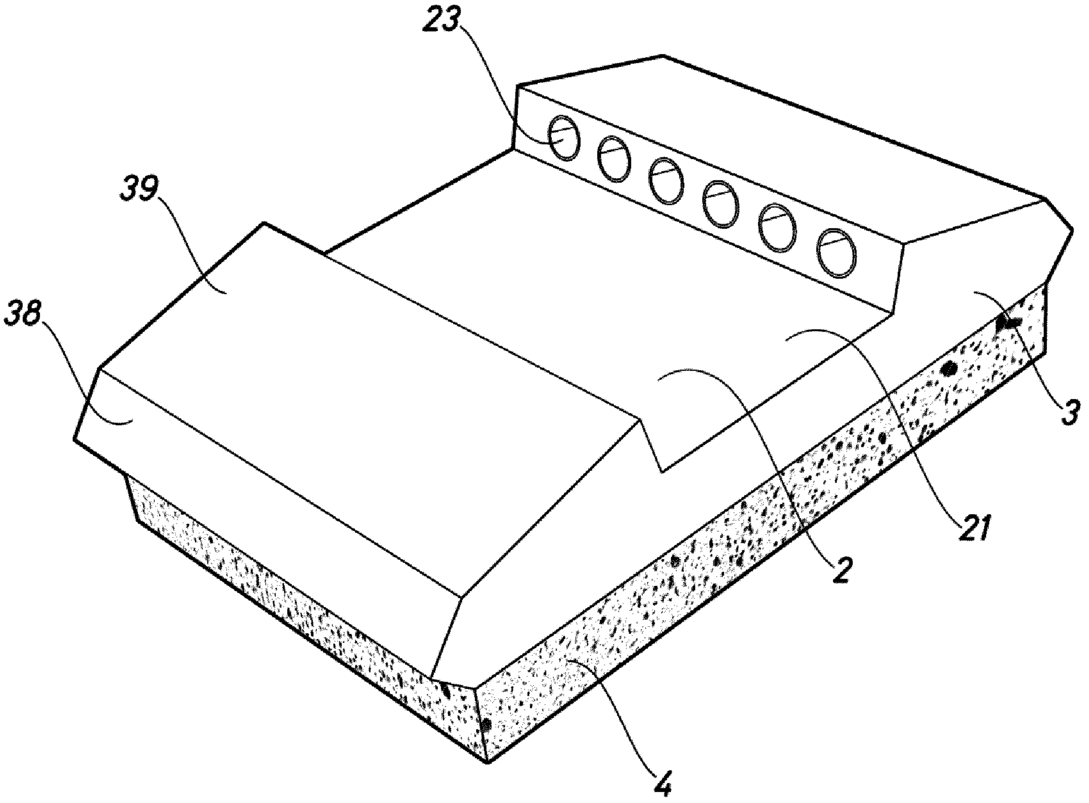
FIG. 14 shows a further passive air purification device.
Figure 15:
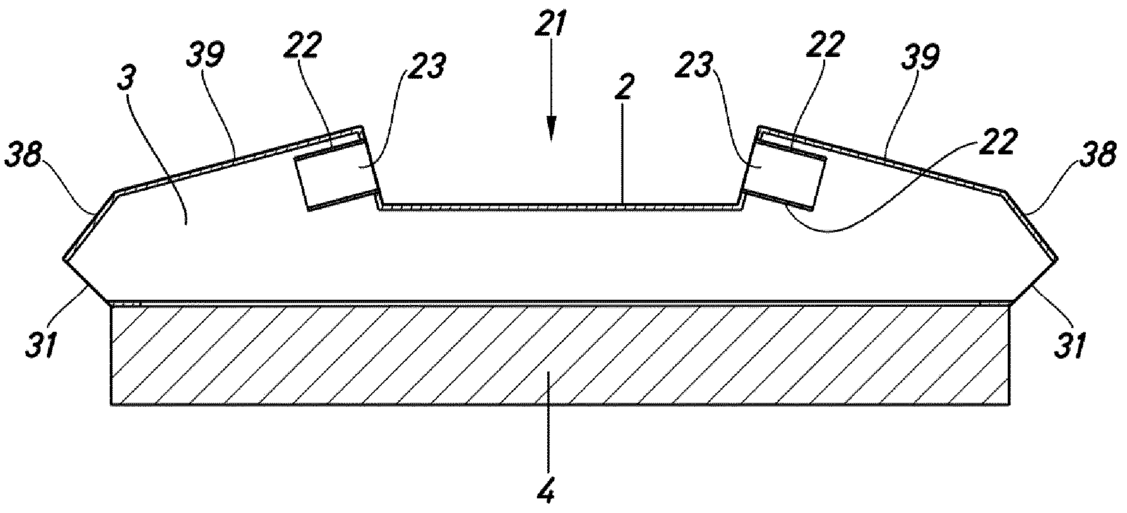
FIG. 15 shows a cross section of the device of FIG. 14.
Figure 16:
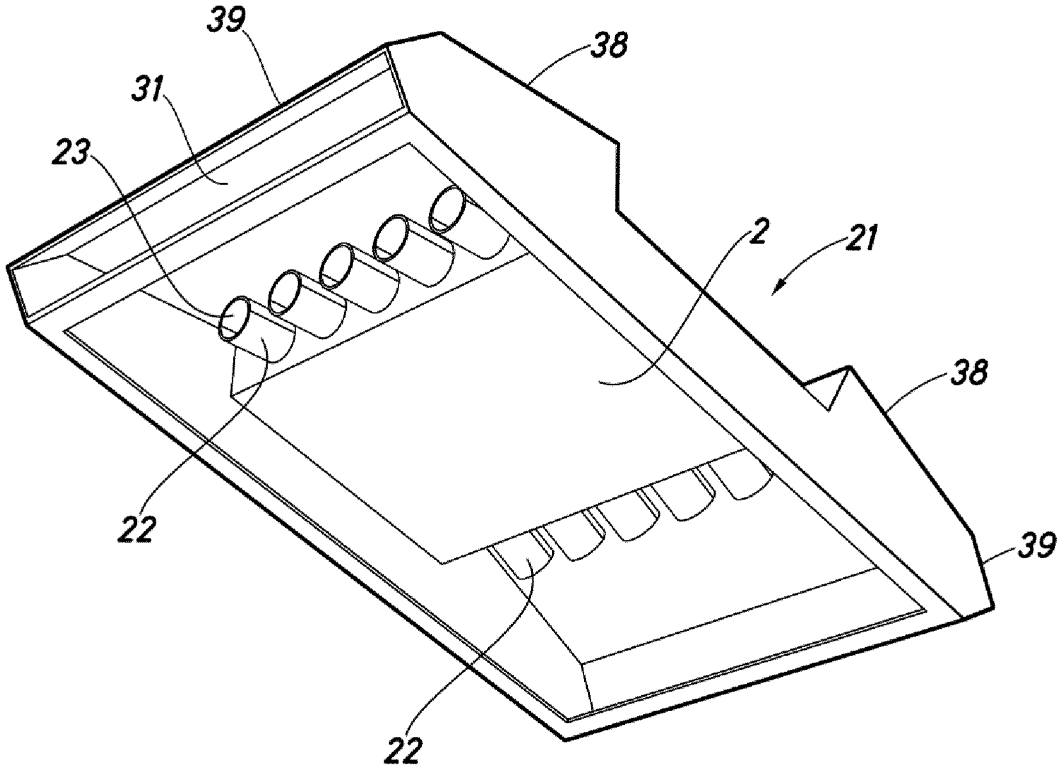
FIG. 16 shows a perspective view from a lower viewpoint of the device of FIG. 14, the filter having been removed.

FIGS. 14-16 show an embodiment wherein a device similar to that of FIGS. 11 and 12 is paired with a mirrored version. The supplied air enters from the top to the inlet area 21 in the inlet body 2 and the will leave the device via the outlets 31. This will entrain air molecules from the filter 4. There are two rows of nozzles 22. The rows are opposite each other and parallel. The distance between rows helps to have a higher entrainment ratio through the filter media. The minimum distance between rows is preferably greater than 20 cm. A maximum distance between rows is preferable 30 cm or less, although it can also be greater. The filter size may increase, and therefore the distance between two rows of nozzles in the paired unit. This helps to have higher entrainment ratio by increasing the filter media.

The distance between nozzles of the same row can be 1.5 to three times the nozzle diameter. All of the nozzles may have holes with the same diameters. It is possible to have half of the nozzles with holes having diameters 50% of the main diameter. In that case, preferably, every other hole has a reduced size diameter.

The present invention can be installed to any supply outlet inside different enclosures such as train carriages, bus cabins, car cabins and inside of buildings. By adding the present invention to an air outlet of these enclosures it is possible to remove the filtration unit of the HVAC system of that enclosure, since it may not be necessary to have central filtration anymore. This results in having a novel air cleaning system where the filtration media is located inside the enclosure, but not in the HVAC system.

Although the invention has been set out and described with reference to embodiments thereof, it should be understood that these do not limit the invention, and that it is possible to alter many structural or other details that may prove obvious to persons skilled in the art after interpreting the subject matter disclosed in the present description, claims and drawings. As an instance, the device of the present invention might comprise more than two output bodies or also a single output body on one side of the air inlet. A single output body configuration can be achieved by having a reduced cross-sectional area zone only on one side of the air inlet and a corresponding output body downstream thereof. Similarly, the device of the present invention can also have any other arrangement and shapes of the components such as a substantially circular air inlet with a single component or multi-component output body around said air inlet. In particular, in principle and unless otherwise explicitly stated, all the features of each of the different embodiments and alternatives shown and/or suggested can be combined.

Therefore, the scope of the present invention includes any variant or equivalent that could be considered covered by the broadest scope of the following claims.

The invention claimed is:

1. A system for enhancing air filtration, which comprises:
an air inlet comprising an air inlet area;
a reduced cross-sectional area zone after the air inlet area, the reduced cross-sectional area zone comprising at least one nozzle; and
an air outlet body after the reduced cross-sectional area zone, said air outlet body comprising at least a wall and an air outlet,
a mixing chamber located within the air outlet body,
wherein at least a zone of the wall of the air outlet body is permeable and comprises an air filter for allowing air from the outside of the system to enter the outlet body via the air filter, wherein the air outlet terminates at or above a horizontal plane defined by an upper surface of the air filter;
the permeable zone being located on a lower face of the system characterized in that the permeable zone is adjacent to the mixing chamber, giving direct access to the mixing area from outside of the system, so that the permeable zone forms a floor of the mixing chamber and in that the angle formed between the floor and the at least one nozzle is between 0 and 40 degrees.

2. The system according to claim 1, wherein the at least one nozzle is parallel to an upper wall of the mixing chamber.

3. The system according to claim 2, wherein the distance between said at least one nozzle and said upper wall is of 1 cm or less.

4. The system according to claim 3, wherein the at least one nozzle is circular cylindrical.

5. The system according to claim 4, wherein the air outlet body has a chamfer which reduces the cross-sectional area of the mixing chamber next to the air outlet.

6. The system according to claim 5, wherein the chamfer is formed by a surface which forms an angle of between 110° and 160° with said upper wall of the mixing chamber.

7. The system according to claim 6, wherein the mixing chamber has walls which continually reduce the cross-sectional area of the mixing chamber from the exit of said at least one nozzle until the air outlet.

8. The system according to claim 7, wherein the outlet has a height that it is at least 1.5 times a diameter of said at least one nozzle.

9. The system according to claim 8, wherein the outlet and the permeable zone are separated a distance of between the diameter and half of the diameter of said at least one nozzle by a frame of non-permeable material.

10. The system according to claim 9, wherein the angle formed between the floor and the at least one nozzle is between 20 and 40 degrees.

11. The system according to claim 10, wherein the air inlet comprises an elongated air inlet body.

12. The system according to claim 11, wherein the air inlet body comprises at least one row of nozzles.

13. The system according to claim 12, wherein the air inlet body comprises two parallel rows of nozzles on opposite sides of the air inlet body.

14. The system according to claim 13, wherein the distance between the center of the nozzles in a row is of 1.5 to three times the nozzle diameter.

15. The system according to claim 13, wherein every other hole in a row has a reduced diameter.

16. The system according to claim 15, wherein the air filter is a particulate filter, a gas filter or a combination of both.

17. The system according to claim 16, wherein it further comprises means for securing it suspended from a ceiling.

18. The system according claim 17, wherein the system comprises a HVAC device and the air inlet body receives refrigerated air from the HVAC device.

19. The system according to claim 18, wherein the filter of the system substitutes a filter of the HVAC device.

* * * * *